(12) United States Patent
Gesell et al.

(10) Patent No.: US 8,834,076 B2
(45) Date of Patent: Sep. 16, 2014

(54) SIDE-MILLING CUTTER, IN PARTICULAR FOR MACHINING TOOTHING SYSTEMS

(75) Inventors: Reinhold Friedrich Gesell, Weihenzell (DE); Rene Schumann, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 25 days.

(21) Appl. No.: 13/576,452

(22) PCT Filed: Feb. 7, 2011

(86) PCT No.: PCT/EP2011/000549
§ 371 (c)(1),
(2), (4) Date: Aug. 1, 2012

(87) PCT Pub. No.: WO2011/098239
PCT Pub. Date: Aug. 18, 2011

(65) Prior Publication Data
US 2012/0301233 A1 Nov. 29, 2012

(30) Foreign Application Priority Data
Feb. 11, 2010 (DE) ...................... 20 2010 002 303 U

(51) Int. Cl.
*B23B 27/22* (2006.01)
*B23F 21/14* (2006.01)
*B23C 5/20* (2006.01)

(52) U.S. Cl.
CPC ....... *B23F 21/146* (2013.01); *B23C 2200/0494* (2013.01); *B23C 2200/125* (2013.01); *B23C 2200/367* (2013.01); *B23C 2200/203* (2013.01); *B23C 2200/123* (2013.01); *B23C 5/207* (2013.01)

USPC .............................................. 407/113; 407/66

(58) Field of Classification Search
USPC ....................... 407/66, 67, 113, 114, 115, 116
See application file for complete search history.

(56) References Cited

U.S. PATENT DOCUMENTS

| | | | | |
|---|---|---|---|---|
| 3,434,190 A | * | 3/1969 | Kaiser | 407/113 |
| 3,557,416 A | * | 1/1971 | Jones | 407/114 |
| 5,363,891 A | * | 11/1994 | Plante | 144/218 |
| 5,368,418 A | * | 11/1994 | Bentjens et al. | 407/114 |
| 5,586,843 A | * | 12/1996 | Minicozzi | 407/42 |
| 5,820,308 A | * | 10/1998 | Hoefler | 407/40 |

(Continued)

FOREIGN PATENT DOCUMENTS

| CN | 1713963 A | 12/2005 |
|---|---|---|
| CN | 1761547 A | 4/2006 |

(Continued)

OTHER PUBLICATIONS

Mar. 25, 2014.

*Primary Examiner* — Will Fridie, Jr.
(74) *Attorney, Agent, or Firm* — Larry R. Meenan, Esq.

(57) ABSTRACT

The invention relates to a side-milling cutter for producing a toothing system, having at least one insert having a rectangular cross section arranged in a holding pocket as an insert seat, having two top surfaces facing away from each other, having two long insert sides located opposite each other and also having two narrow insert sides located opposite each other. Of four cutting edges of the insert which extend along the long insert sides in the longitudinal direction, in each case two cutting edges delimit the top surfaces of the insert at the edge, each cutting edge extending in a curve.

11 Claims, 8 Drawing Sheets

(56) References Cited

U.S. PATENT DOCUMENTS

| | | | | |
|---|---|---|---|---|
| 5,957,629 | A * | 9/1999 | Hessman et al. | 407/113 |
| 6,503,028 | B1 * | 1/2003 | Wallstrom | 407/35 |
| 6,773,209 | B2 * | 8/2004 | Craig | 407/63 |
| 7,153,068 | B2 * | 12/2006 | Satran et al. | 407/66 |
| 7,252,461 | B2 * | 8/2007 | Karonen | 407/113 |
| 7,309,193 | B2 * | 12/2007 | Riviere et al. | 407/113 |
| 2009/0136304 | A1 * | 5/2009 | Satran et al. | 407/104 |

FOREIGN PATENT DOCUMENTS

| | | |
|---|---|---|
| CN | 102227278 A | 10/2011 |
| DE | 22 34 854 A1 | 2/1973 |
| DE | 200 16 673 U1 | 12/2000 |
| DE | 101 44 735 A1 | 4/2003 |
| JP | 57 118129 U | 7/1982 |

* cited by examiner

SIDE-MILLING CUTTER, IN PARTICULAR FOR MACHINING TOOTHING SYSTEMS

CLAIM TO PRIORITY

This application is a National Phase of International Application PCT/EP2011/000549, filed on Feb. 7, 2011, which claims priority to German Application No. 20 2010 002 303.3, filed on Feb. 11, 2010, the entire contents of all these applications are incorporated herein by reference.

BACKGROUND OF THE INVENTION

1. Field of the Invention

The invention relates to a side-milling cutter equipped with indexable inserts and intended for machining toothing systems. The invention furthermore relates to an indexable insert for a side-milling cutter of this kind for machining toothing systems.

2. Description of Related Art

With the aid of milling tools of this kind, the respective toothing system, which can be configured either as an external toothing system or as an internal toothing system, can be milled from a solid blank, generally in a single-cut machining operation.

In the field of indexable inserts for side-milling cutters, which are also referred to as indexable cutting inserts, the only indexable inserts known hitherto are those with two cutting lips that can be used in succession. Here, one side of the indexable insert is designed as a bearing surface for the indexable insert in the insert seat, while the side facing away from the bearing surface is provided with two different cutting edges or cutting contours, which can be used in succession.

SUMMARY OF THE INVENTION

Taking this as a starting point, it is the underlying object of the invention to indicate a side-milling cutter for machining toothing systems having an indexable cutting insert with four cutting lips that can be used in succession.

According to the invention, this object is achieved by means of the features of claim 1. Advantageous embodiments, developments and variants form the subject matter of the dependent claims.

For this purpose, a side-milling cutter equipped with indexable inserts is provided. Each indexable insert, which is arranged in a holding pocket as an insert seat, has a rectangular cross section having two top surfaces facing away from each other, having two longitudinal insert sides located opposite each other and having two narrow insert sides located opposite each other. Two cutting edges in each case delimit the top surfaces at the edge, with the result that a total of four cutting edges, each extending in an arc, extend along the longitudinal insert sides in the longitudinal direction of the insert.

The side-milling cutter expediently has holding pockets on both sides as insert seats for a number of indexable inserts. It is expedient if the indexable inserts are set obliquely to the central longitudinal plane of the disk, which intersects the longitudinal center line of the side-milling cutter. Inserting the indexable inserts into the tool at a certain oblique insertion angle means that the insert planes of the indexable inserts do not extend in the same plane as the plane of the disk of the side-milling cutter. On the contrary, the plane of the indexable inserts is set obliquely to the plane of the side-milling cutter.

In a preferred embodiment, the side-milling cutter is equipped with a mixture of the indexable inserts having four mutually parallel cutting edges shaped arcuately or spherically and of tooth head machining inserts suitable specifically for machining the tooth heads, expediently in a ratio of 1:1, i.e. an equal number of indexable inserts and tooth head machining inserts. The side-milling cutter is equipped alternately, with indexable inserts and tooth head machining inserts suitable exclusively for machining the tooth heads of a toothing system being arranged alternately in corresponding holding pockets of the side-milling cutter. Both the indexable inserts and the tooth head machining inserts are then expediently set obliquely to the longitudinal center plane of the disk.

With the side-milling cutter according to the invention, it is possible to carry out a process for producing both an internal toothing system, e.g. that of an internally toothed gear ring, and an external toothing system, e.g. that of an externally toothed gearwheel. In this production process, both the respective tooth flank and the respective tooth head are milled in a single milling operation. A significant reduction in dwell times in the production of toothing systems is thereby achieved.

As regards the indexable inserts (indexable cutting inserts), the arcuate profile of the cutting edges makes them suitable for milling the tooth flank contour. The arcuate profile of the cutting edges brings about a spherical configuration of the cutting lips that are effective during milling. Owing to the spherical shape of the cutting lips, the top surfaces can be used as supporting surfaces for the indexable insert in the insert seat, while, at the same time, it is possible to use all four cutting edges as cutting lips. The main advantage therefore consists in the doubling of the number of cutting lips that can be used in succession.

In a variant embodiment of the invention, a central area of the two top surfaces facing away from each other is designed as a bearing area for the indexable insert in the insert seat. The top surfaces are delimited at the edges thereof by the cutting edges. The areas between the bearing areas and the cutting edges can be set back in height relative to the top surfaces in order to form clearance surfaces and hence provide the required clearance for the indexable cutting inserts during the machining of the toothing system.

In one embodiment of the invention, a chip step is provided on or in the narrow side extending in the longitudinal direction of the insert, i.e. on or in the longitudinal insert side of the indexable insert. The respective chip step is formed in the respective longitudinal insert side below the cutting edge associated with it. A clearance surface extending into the top surface or formed by the latter in the insert seat adjoins the cutting edge on the longitudinal side facing away from the chip step.

According to a suitable variant of the indexable insert, the arcuate profile of the cutting edge is formed by a convex edge profile directed toward the respective top surface. This is formed by drawing in or removing the top surfaces to an increasing extent, starting approximately from the center of the insert, toward the corners of the insert along the cutting edges, with the result that the indexable insert becomes thinner in practice toward the four corners of the insert. In this variant, the end edges on the narrow sides of the insert, which connect the cutting edges at the ends, can be profiled to form an additional end cutting lip. Here, the end cutting lip preferably consists of a plurality of individual radii.

According to another variant of the indexable insert, the arcuate profile of the cutting edge is formed by an edge profile which starts from the respective top surface and extends concavely into the adjoining longitudinal insert side. The arcuate profile of the cutting edge can furthermore be formed by an edge profile which arches convexly outward or arches concavely inward in the plane of the respective top surface.

Owing to the slightly arcuate profile of the cutting edge, which can be either convex or concave in the plane of the longitudinal insert side (i.e. directed toward the chip step) or in the plane of the top surface, the cutting lip receives its spherical configuration for machining a toothing system in the flank area.

The concave profile of the cutting edge can be formed by drawing in the cutting edge arcuately toward the cutting edge located opposite the latter in the same longitudinal insert side. In this case, the cutting edge extends in a straight line when viewed toward the top surface and arches concavely toward the center of the longitudinal insert side when viewed toward the longitudinal insert side. The concave profile of the cutting edge can also be formed by drawing in the cutting edge in an arc toward the cutting edge located opposite the latter in the same top surface. In this case, the cutting edge extends in a straight line when viewed toward the longitudinal insert side and arches concavely toward the center of the top surface when viewed toward the top surface.

In these variants and in the variant in which the cutting edges of the rectangular indexable insert are convexly curved in the plane of the respective top surface, only the two long or longitudinal insert sides of the rectangle form cutting edges extending over the entire length thereof. In this embodiment, the short sides connecting the two long or longitudinal insert sides of the rectangle, which short sides form the end edges of the indexable insert, have no function. Hence, this indexable insert is suitable only for machining tooth flanks of a toothing system. For machining the tooth heads of the toothing system, additional tooth head machining inserts must be provided.

If clearance surfaces are provided on the same side as the top surfaces of the insert and the cutting edges extend in a concave shape adjoining the bearing areas, this indexable insert is used to produce a convex tooth contour of the kind encountered in an external toothing system. Conversely, a tool having cutting edges which extend convexly into the bearing area is used to produce a concave tooth contour of the kind which occurs in an internal toothing system.

In this embodiment described above, it is generally necessary to provide twice the number of cutting inserts for machining the tooth heads in comparison with the number of indexable inserts for machining the tooth flanks. In some circumstances, this may lead to space problems for the cutter disk because the cutter disk does not have sufficient installation space for the large number of cutting elements.

A remedy is provided here by the embodiment in which not only the two cutting edges delimiting the top surfaces at the edge, said edges being formed by the longitudinal insert sides (long sides) in the rectangular embodiment, but also the end edges connecting the cutting edges at the ends are effective as additional end cutting lips. This is achieved in a particularly effective manner by means of a spherical configuration of the end edges. The spherical configuration of the end edges gives rise to a particularly effective rounded end cutting lip formed by one or more successive radii and adjoining the cutting edges. The end cutting lip consisting of a plurality of radii has the advantage that it is particularly adaptable to the tooth head geometry to be machined.

With this combination of a cutting edge and an end cutting lip, it is possible to machine not only the tooth flanks but also the tooth heads of the toothing system to be milled. For finish machining of the tooth heads, a further cutting insert specifically designed for head machining can then be provided for each indexable insert. In this embodiment, the indexable inserts which are suitable for machining both the tooth flanks and the tooth heads and the cutting inserts suitable specifically for machining the tooth heads can be arranged on the side-milling cutter the tooth head machining inserts in a ratio of 1:1. In this way, the number of cutting inserts required is significantly reduced, thereby ensuring that there is always sufficient installation space available on the side-milling cutter.

BRIEF DESCRIPTION OF THE DRAWINGS

Illustrative embodiments of the invention are explained in greater detail below with reference to a drawing, in which.

Corresponding parts are provided with the same reference signs in all the figures.

DETAILED DESCRIPTION OF THE INVENTION

Figure 1:
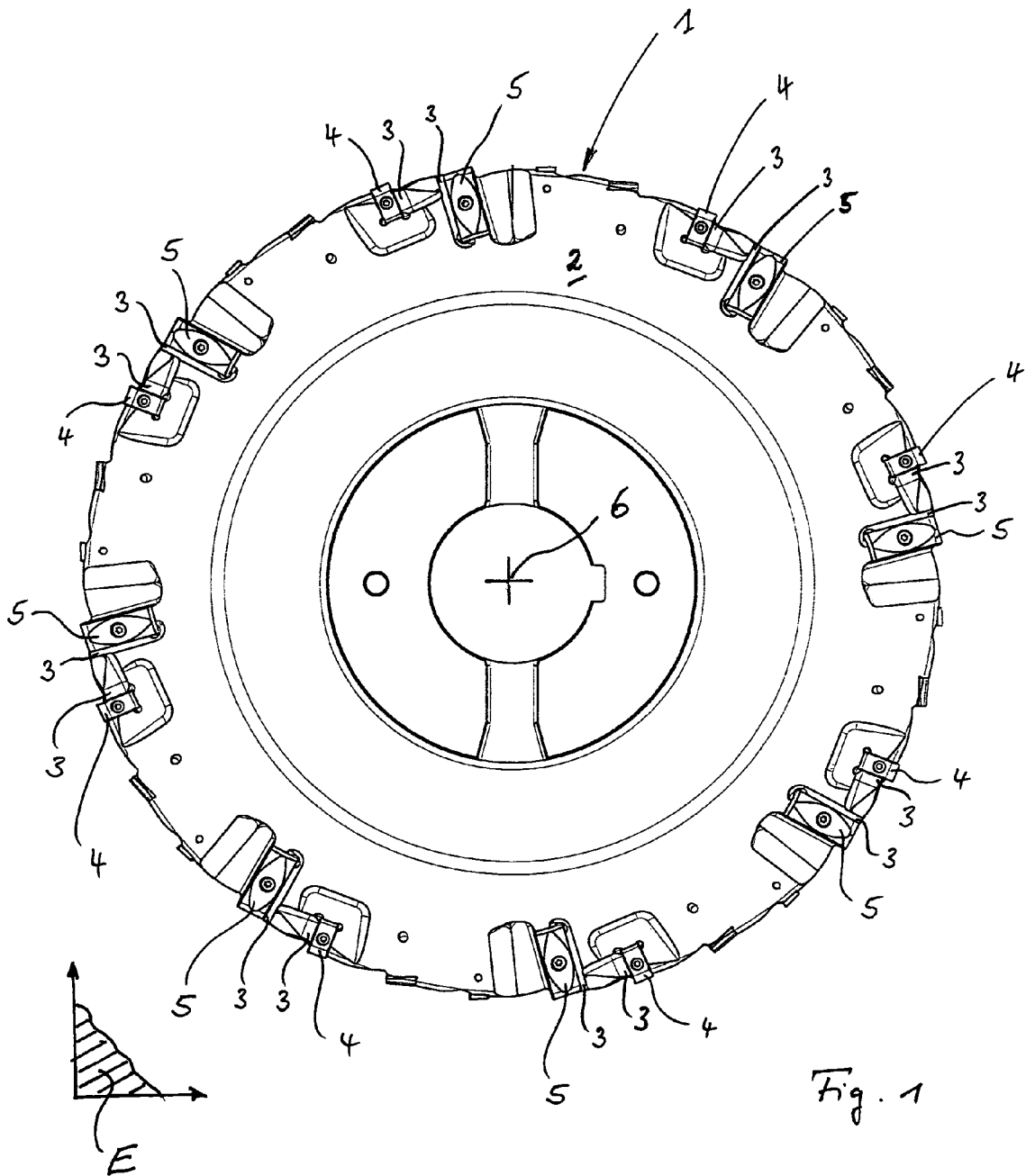
FIG. 1 shows a side view of a side-milling cutter equipped alternately with indexable inserts or indexable cutting inserts for machining tooth flanks and with tooth head machining inserts for machining tooth heads.
Figure 2:
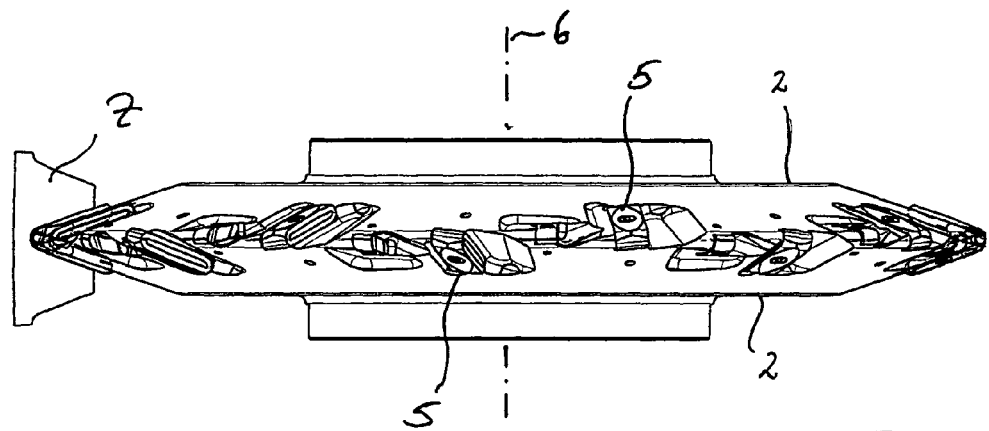
FIG. 2 shows a plan view of the circumference of the side-milling cutter illustrated in FIG. 1.
Figure 3:
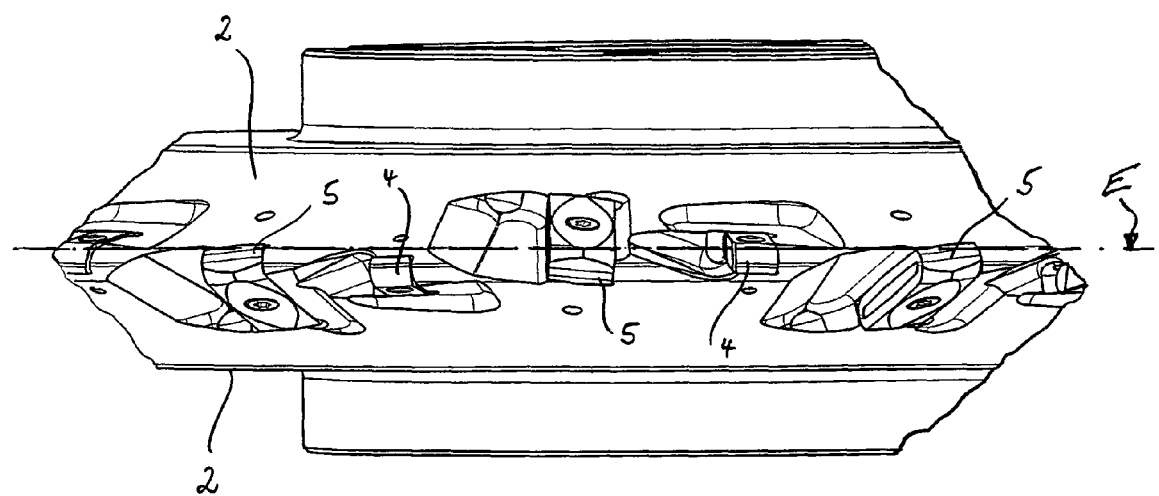
FIG. 3 shows an enlarged plan view of the side-milling cutter shown in FIG. 2.

The side-milling cutter 1 illustrated in FIGS. 1 to 3 has insert seats formed as holding pockets 3 in each side wall 2 to hold cutting elements. In the illustrative embodiment, these cutting elements are designed as tooth head machining inserts 4 and as indexable inserts 5 for the production of a toothing system Z. Perpendicularly to the longitudinal center line 6, the longitudinal center plane E of the disk intersects the side-milling cutter 1. The longitudinal center plane E of the disk of the side-milling cutter 1 thus extends in the plane of the drawing of FIG. 1. From the illustration in FIG. 3, it is clear that both the indexable inserts 5 and the tooth head machining inserts 4 are set obliquely to the longitudinal center plane E of the disk of the side-milling cutter 1.

The indexable inserts (indexable cutting inserts) 5 illustrated in the illustrative embodiments have a rectangular cross section having two mutually parallel top surfaces 9 facing away from each other, having two longitudinal insert sides 5b located opposite each other and having two narrow insert sides 5b located opposite each other. The longitudinal insert sides 5a of the rectangle and hence of the indexable insert 5, which are also referred to as long sides, are designed as cutting edges 7. The indexable inserts 5 illustrated in the illustrative embodiments furthermore have a central fastening opening 8. A clamping pin or a clamping screw can be inserted through the fastening opening 8 in order to fasten the indexable insert 5 on the tool, i.e. on the side-milling cutter 1.

The fastening opening 8 is embedded in a bearing area 10 protruding from the top surface 9 in the region of each of the mutually opposite top surfaces 9 of each indexable insert 5. By means of the bearing region 10, the indexable insert 5 rests with its inactive side on the bottom of the holding pocket 3 when mounted. The bearing region 10 thus supports the indexable insert 5 relative to the holding pocket 3.

Arranged between the bearing region 10 and the respective cutting edges 7 there is in each case a clearance surface 11 set back from the top surface 9. In the illustrative embodiment in FIG. 4, FIG. 5 and FIG. 6, the clearance surface 11 is concave in shape. This means that the clearance surface 11 there extends concavely into the bearing region 10 in such a way that a concavely curved profile of the cutting edges 7 is obtained in the plane of the longitudinal insert side 5a (FIG. 6).

In the illustrative embodiments in FIG. 4 to FIG. 12, the cutting edges 7 extend along the longitudinal insert sides 5a of the indexable inserts 5 over the entire length thereof in the longitudinal direction (longitudinal direction of the insert) 12. In the transverse direction (transverse direction of the insert) 13, which is at right angles to the longitudinal direction 12, an end edge 14 of the indexable insert 5 in each case connects the longitudinal insert sides 5a with the cutting edges 7 to each other.

Figure 4:
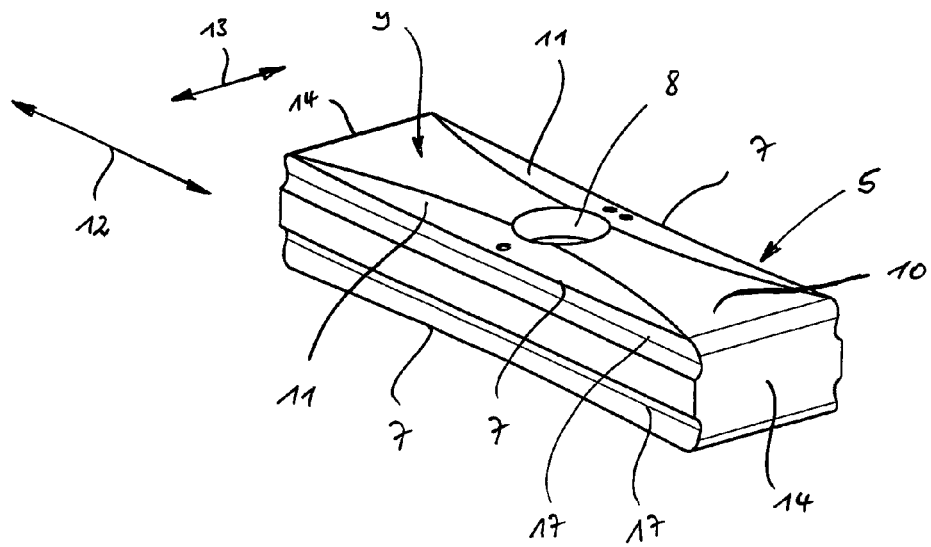
FIG. 4 shows a perspective view of an indexable insert having a clearance surface extending concavely in a direction toward a bearing area of the top surface of said insert.
Figure 5:
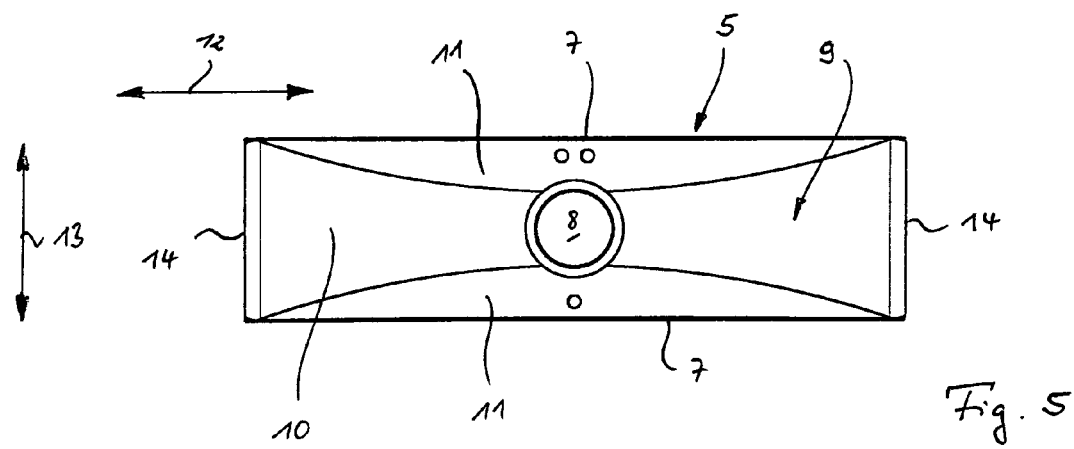
FIG. 5 shows a plan view of the indexable insert illustrated in FIG. 4.
Figure 6:
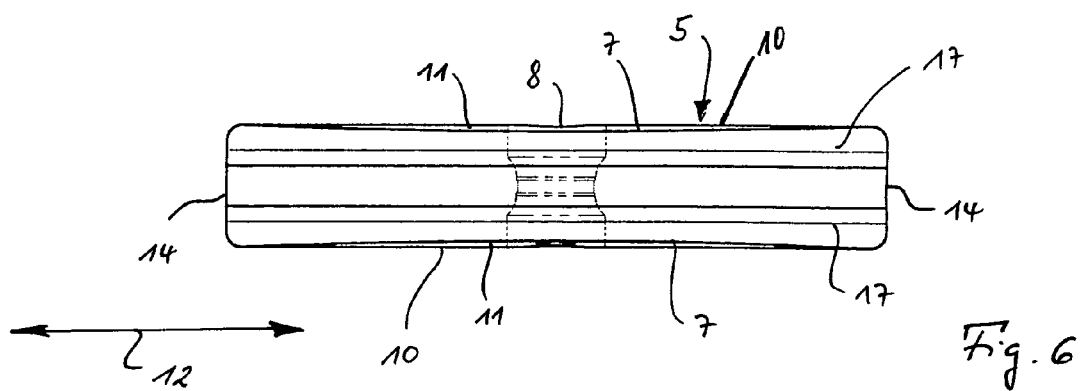
FIG. 6 shows a side view of the indexable insert illustrated in FIG. 4 having a cutting edge which arches concavely inward in the longitudinal insert side of said insert.
Figure 7:
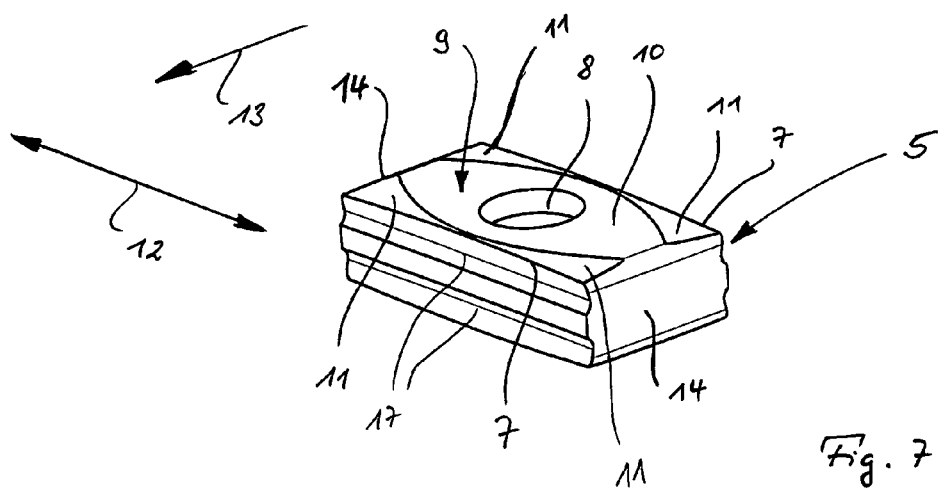
FIG. 7 shows a perspective view of an indexable insert having a clearance surface extending convexly in a direction toward the bearing area of the top surface of said insert.
Figure 8:
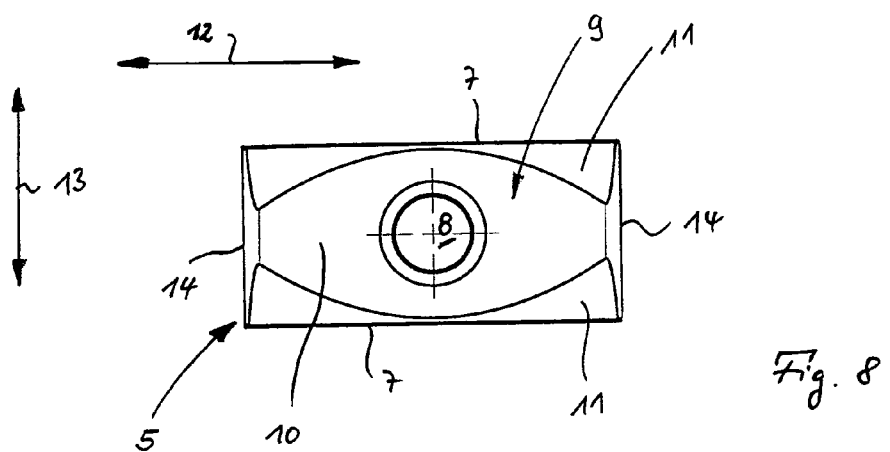
FIG. 8 shows a plan view of the indexable insert illustrated in FIG. 7.
Figure 9:
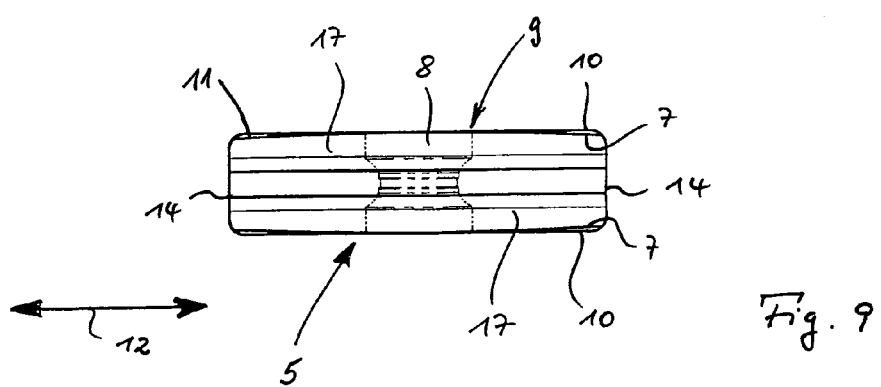
FIG. 9 shows a side view of the indexable insert illustrated in FIG. 7 having a cutting edge arched convexly toward the top surface in the longitudinal insert side thereof.

In the embodiments of the indexable insert 5 shown in FIG. 4, FIG. 5 and FIG. 6, on the one hand, and the embodiments of the indexable insert 5 shown in FIG. 7, FIG. 8 and FIG. 9, on the other hand, the end edges 14 are inactive during milling. This means that these indexable inserts 5 mill exclusively with the cutting edges 7 thereof. During machining, the cutting edges 7 mill the tooth flanks of the toothing system. In the case of a side-milling cutter having the indexable inserts 5 shown in FIG. 4, FIG. 5 and FIG. 6 or FIG. 7, FIG. 8 and FIG. 9, the tooth heads are machined exclusively by means of the tooth head machining inserts 4.

The illustrative embodiment of the indexable insert 5 shown in FIG. 4, FIG. 5 and FIG. 6 having the concave clearance surface 11 is used to produce a convex contour, i.e. to produce an external toothing system. The clearance surface 11 of convex design having the correspondingly convexly curved cutting edge 7 in the illustrative embodiment of the indexable insert 5 in FIG. 7, FIG. 8 and FIG. 9, on the other hand, is used to produce a concave contour, i.e. an internal toothing system.

In the region of its longitudinal insert side 5a (side wall extending in the longitudinal direction 12 of the insert), which extends in the longitudinal direction 12 of the insert, so-called chip steps 17 are in each case formed below the cutting edges 7 in the illustrative embodiments of the indexable insert 5 shown in FIG. 4, FIG. 5 and FIG. 6, on the one hand, and in the illustrative embodiments of the indexable insert 5 shown in FIG. 7, FIG. 8 and FIG. 9, on the other hand. In principle, it is also possible to achieve the arcuate profile of the cutting edges 7 by forming the cutting edges 7 in an arc toward the respective chip step 17 in the plane of the respective top surface 9. In this variant embodiment, the clearance surfaces 11 can be omitted. The tool clearance required during milling is then produced exclusively through the oblique positioning of the indexable inserts 5 relative to the longitudinal center plane of the disk of the side-milling cutter 1 and thus by the respective top surface 9 itself.

Figure 10:
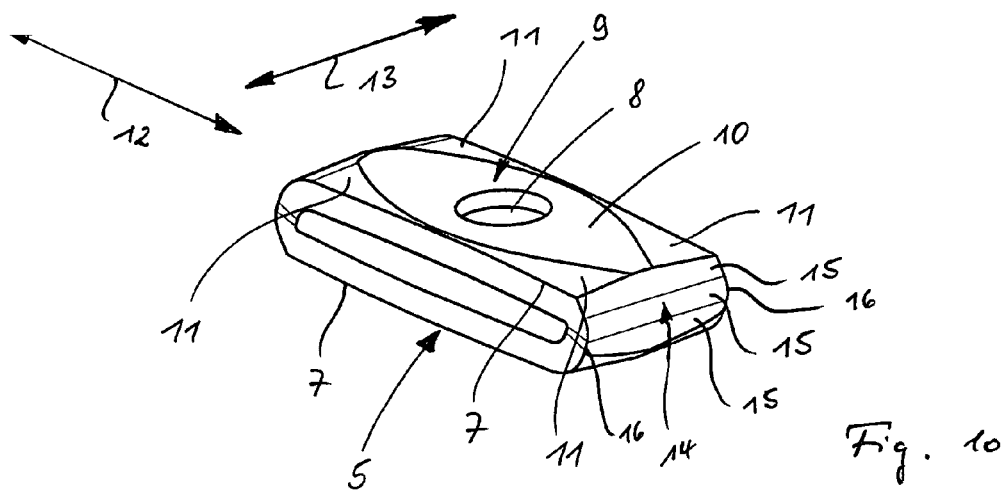
FIG. 10 shows a perspective view of an indexable insert having a clearance surface extending convexly in a direction toward the bearing area of the top surface of said insert and having end edges of profiled design on the narrow insert sides.
Figure 11:
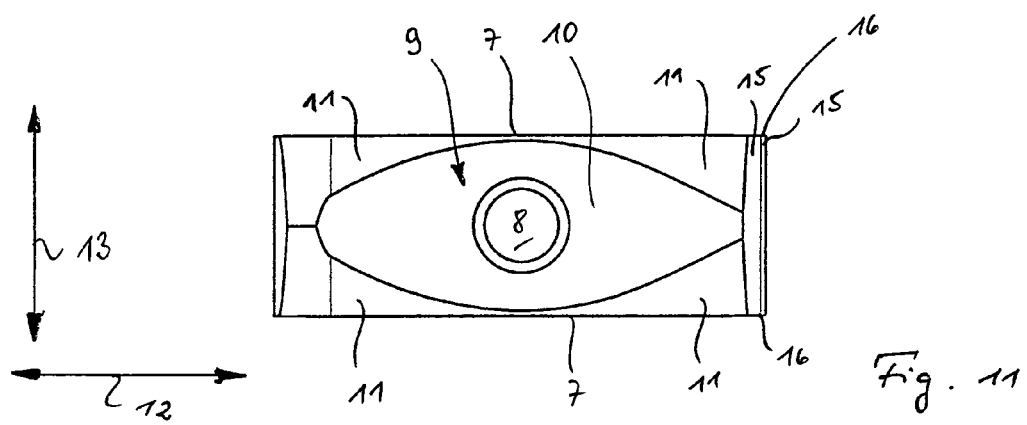
FIG. 11 shows a plan view of the indexable insert illustrated in FIG. 10.
Figure 12:
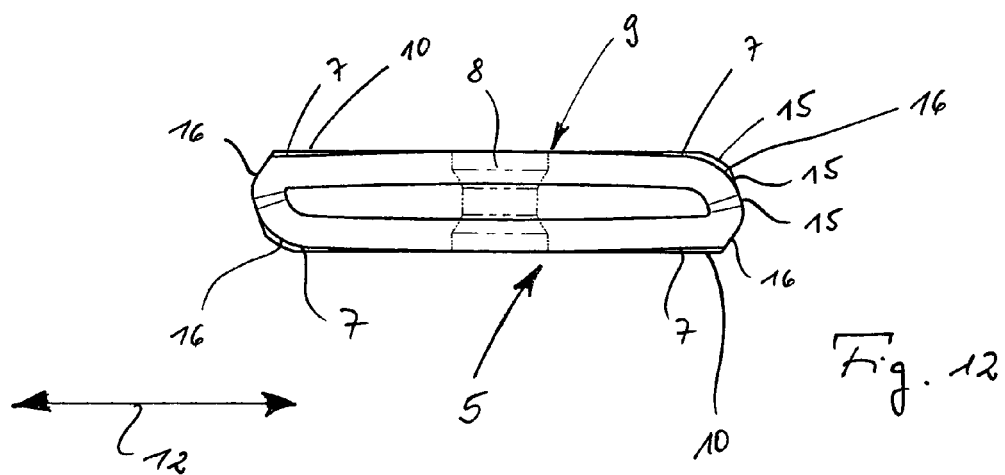
FIG. 12 shows a side view of the indexable insert illustrated in FIG. 10 having a cutting edge which arches convexly toward the top surface in the longitudinal insert side thereof.

In principle, the illustrative embodiment illustrated in FIG. 10, FIG. 11 and FIG. 12 has the same construction as the illustrative embodiment of the indexable insert 5 shown in FIG. 7, FIG. 8 and FIG. 9. In the illustrative embodiment in FIG. 10, FIG. 11 and FIG. 12, the end edge 14 is configured so as to be spherical in such a way that three mutually adjoining individual radii 15 as it were round out the end edge 14 of the indexable insert 5 and thus form an additional end cutting lip 16. The end cutting lip 16 adjoins the respective cutting edge 7 seamlessly in the longitudinal direction 12 of the insert.

The end cutting lip 16 interacts with the cutting edge 7 in such a way that, as the toothing system is milled, the cutting edge 7 machines the tooth flank of the tooth to be milled, as in the other illustrative embodiments, while the end cutting lip 16 machines the head of the respective tooth and thus supplements or replaces the head machining carried out by the tooth head machining insert 4 that is adjacent in the side-milling cutter 1 in each case.

From viewing the figures of the drawing, it will be apparent that each indexable insert 5 has four different cutting edges 7, namely in each case two in or in the region of the respective top surface 9. The total of four cutting edges 7 thus extend at least approximately parallel to each other.

The illustrative embodiment of the indexable insert 5 shown in FIG. 10, FIG. 11 and FIG. 12 furthermore has four end cutting lips 16 in each case. By pivoting the indexable insert 5 first of all in the transverse direction 13 of the insert, after this in the longitudinal direction 12 of the insert and then in the transverse direction 13 of the insert again, the four cutting edges 7 in all the embodiments or the four cutting edges 7 and the four end cutting lips 16 in the illustrative embodiment shown in FIG. 10, FIG. 11 and FIG. 12 are used in succession. For the first time, therefore, an indexable insert 5 with four cutting lips for a side-milling cutter 1 for machining toothing systems has been obtained.

In the illustrative embodiment shown in FIG. 10, FIG. 11 and FIG. 12, however, it should be noted that the indexable insert 5 can first of all be pivoted about the longitudinal axis of the insert, which extends in the longitudinal direction 12 of the insert, so as then to be reclamped in the same holding pocket 3. To use the two remaining cutting edges 7 or end cutting lips 16, the holding pocket 3 must be changed in such a way that, in the case of use first of all in a holding pocket 3 on the left of the longitudinal center line 6, a changeover must then be made to a holding pocket 3 on the right of the longitudinal center line 6 of the side-milling cutter 1 and vice versa. In this embodiment, it is therefore possible to use only two mutually opposite cutting edges 7 and end cutting lips 16 in succession, in each case in the same holding pocket 3.

Figure 13:
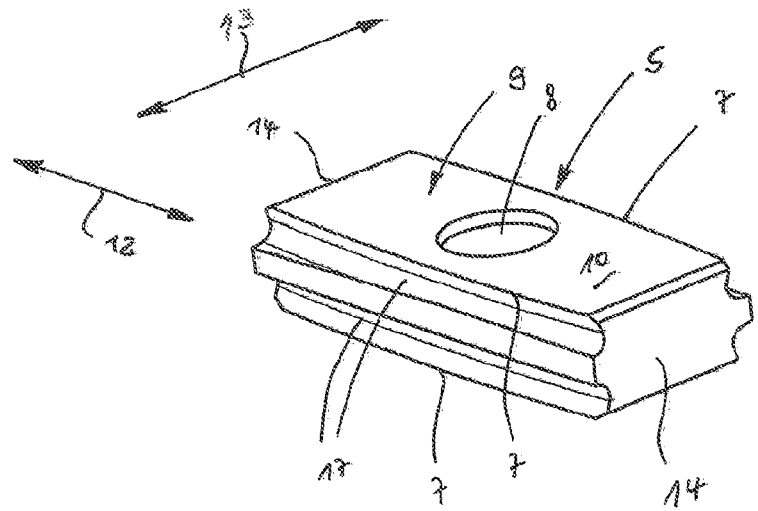
FIG. 13 shows a perspective view of an indexable insert having a rectangular cross section and a cutting edge which is convex in the plane of the top surface thereof.
Figure 14:
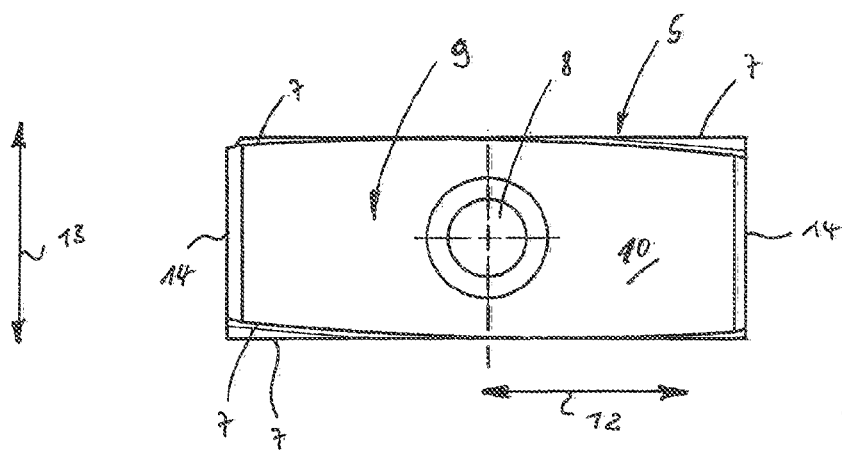
FIG. 14 shows a plan view of the indexable insert illustrated in FIG. 13.
Figure 15:
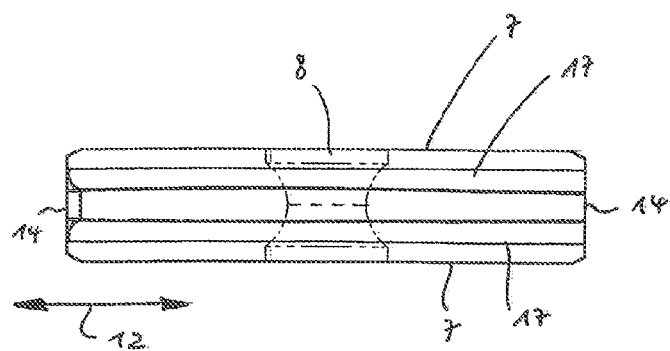
FIG. 15 shows a side view of the indexable insert illustrated in FIG. 13.

In the illustrative embodiment shown in FIG. 13, FIG. 14 and FIG. 15, the bearing region 10 extends over the entire top surface 9 of the indexable insert 5. In this embodiment, there are no clearance surfaces introduced into the indexable insert 5 itself. On the contrary, the top surfaces 9 form the clearance surfaces in the insert seat.

In this embodiment, the cutting edges 7 are convex, as shown in FIGS. 13 to 16. This convex profile of the cutting edges 7 is based on the fact that the cutting edges 7 are formed in an arc in the plane of the respective top surface 9 and from the chip step 17 in that the top surfaces 9 are drawn back toward the center of the indexable insert 5, situated in the region of the fastening opening 8, in the corner regions of the indexable insert 5 by removal or omission of material, while the vertex of the arc of the respective cutting edge 7 does not protrude beyond the longitudinal insert side 5a. From the illustration in FIG. 14, it can be seen that the cutting edges 7 in the same top surface 9 of the indexable insert 5 have an opposed convex profile on the opposite side.

Figure 16:
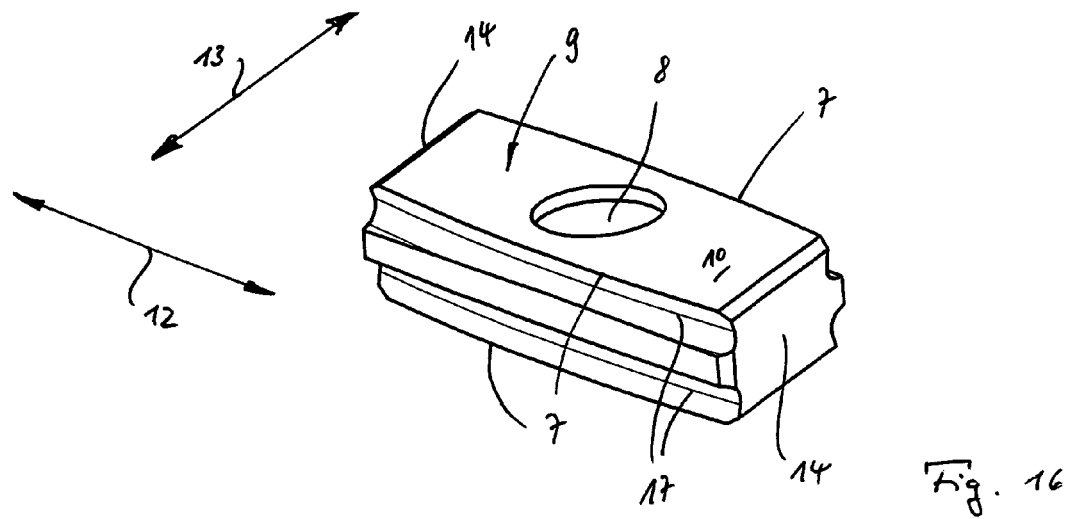
FIG. 16 shows a perspective view of an indexable insert having a trapezoidal cross section and having a cutting edge which is convex in the plane of the top surface thereof.
Figure 17:
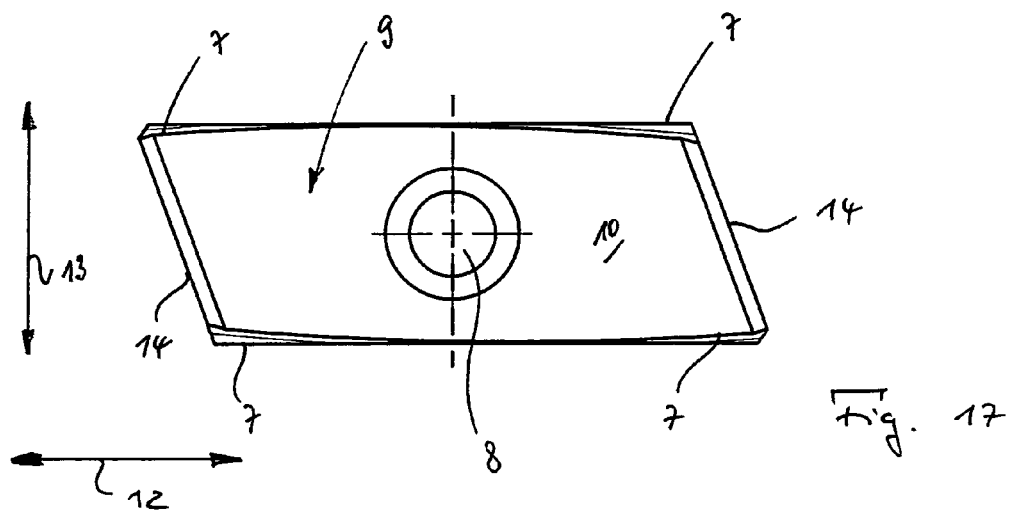
FIG. 17 shows a plan view of the indexable insert illustrated in FIG. 16.
Figure 18:
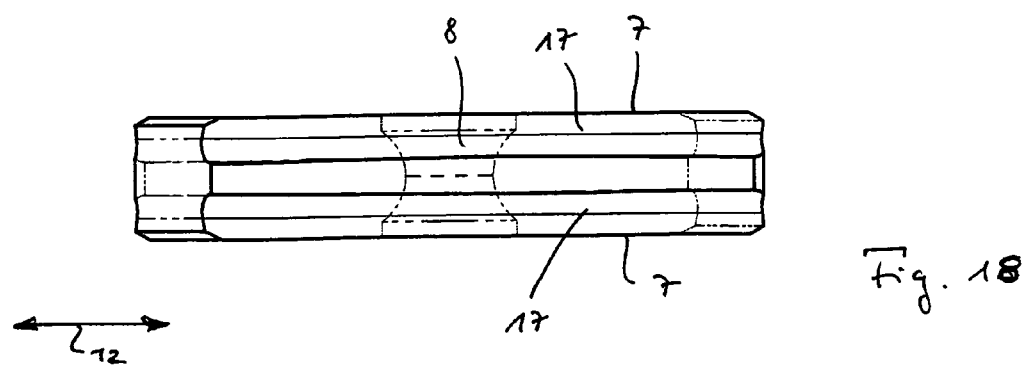
FIG. 18 shows a side view of the indexable insert illustrated in FIG. 16.

The illustrative embodiment of the indexable insert 5 illustrated in FIGS. 16, 17 and 18 has a trapezoidal cross section, as is relatively clear from FIG. 17. The end edges 14 of the transverse insert sides 5b extend obliquely to the body of the indexable insert 5. With the aid of this trapezoidal cross section, it is possible to achieve larger shaving angles. The cutting edge 7 extends in the plane of the respective top surface 9 convexly cutting edge 7 since, once again, the top surfaces 9 are drawn back toward the center of the insert (fastening opening 8) of the indexable insert 5 in the corner regions of the indexable insert 5 by removal or omission of material.

Figure 19:
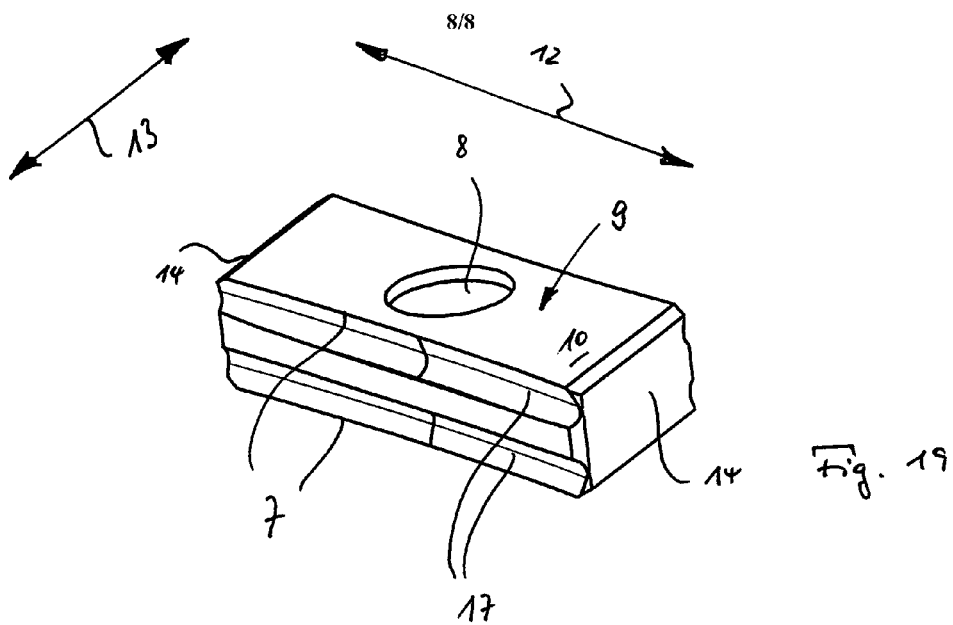
FIG. 19 shows a perspective view of an indexable insert having a trapezoidal cross section and having a cutting edge which arches concavely into the top surface in the plane of the latter.
Figure 20:
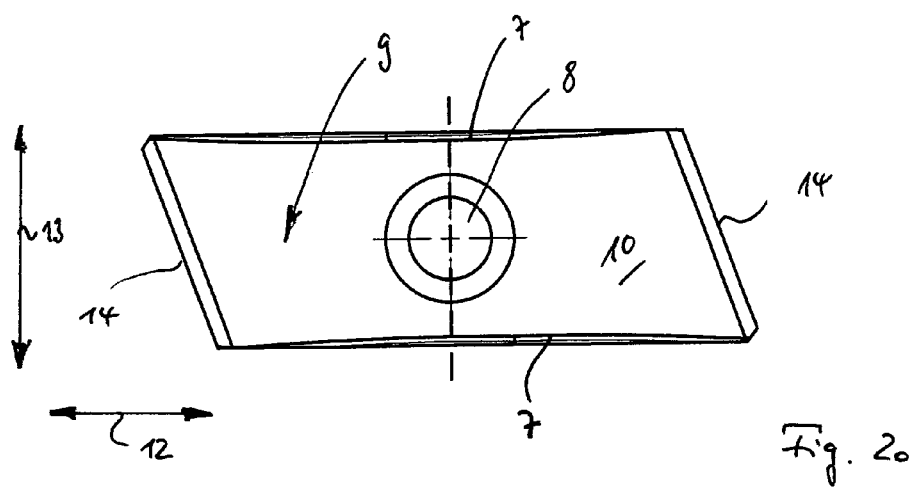
FIG. 20 shows a plan view of the indexable insert illustrated in FIG. 19.
Figure 21:
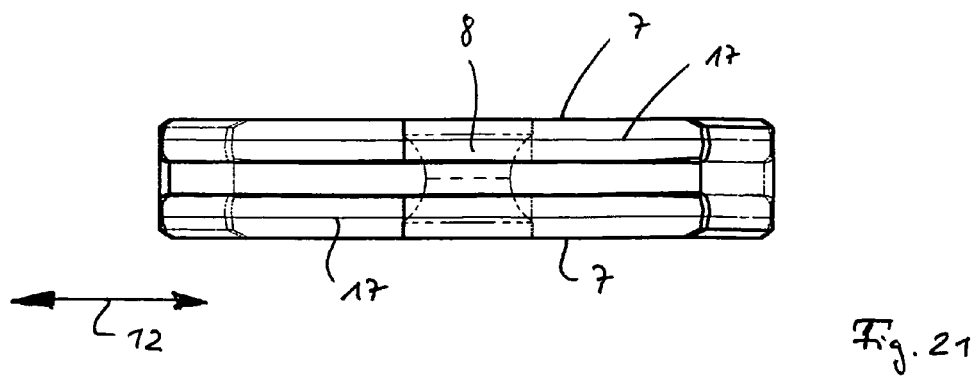
FIG. 21 shows a side view of the indexable insert illustrated in FIG. 19.

In the embodiment of an indexable insert 5 illustrated in FIG. 19, FIG. 20 and FIG. 21, which has concave cutting edges 7, an arcuate profile which draws in toward the center of the insert (fastening opening 8) in the region of the latter through removal or omission of material and extends into the corner regions of the top surface 9 of the indexable insert 5 is formed. Once again, this indexable insert 5 has a continuous bearing area 10 formed by the top surface 9 without clearance surfaces formed in the indexable insert 5 itself. Once again, the cross section of this indexable insert 5 is trapezoidal in order to obtain a larger shaving angle.

What is claimed is:

1. A side-milling cutter for producing a toothing system, having at least one indexable insert of rectangular cross section arranged in a holding pocket as an insert seat, said indexable insert having two top surfaces facing away from each other, having two longitudinal insert sides located opposite each other, having two narrow insert sides located opposite each other and having in each case two cutting edges delimiting the top surfaces at the edge, and having alternately equipped holding pockets such that indexable inserts and tooth head machining inserts suitable exclusively for machining the tooth heads of a toothing system are arranged alternately, wherein the four cutting edges extend along the longitudinal insert sides in the longitudinal direction of the insert, and wherein each cutting edge extends in an arc.

2. The side-milling cutter as claimed in claim 1, having holding pockets on both sides as insert seats for a number of indexable inserts.

3. The side-milling cutter as claimed in claim 1, having a central longitudinal plane of the disk, which intersects the longitudinal center line of said cutter, wherein the indexable inserts are set obliquely to the central longitudinal plane of the disk.

4. The side-milling cutter as claimed in claim wherein both the indexable inserts and the tooth head machining inserts are set obliquely to the central longitudinal plane of the disk.

5. The side-milling cutter as claimed in claim 1, wherein each indexable insert has a chip step, which is formed in the respective longitudinal insert sides, below the cutting edge, and a clearance surface adjoining the cutting edge and extending into the top surface or formed by the latter in the insert seat.

6. The side-milling cutter as claimed in claim 1, wherein each indexable insert has a central bearing area projecting from the respective top surface and a clearance surface set back from the top surface, between the cutting edge and the bearing area on each top surface.

7. An indexable insert for a side-milling cutter as claimed in claim 1, wherein the arcuate profile of the cutting edge is formed by a convex edge profile directed toward the respective top surface.

8. The indexable insert for a side-milling cutter as claimed in claim 7, wherein the end edges on the narrow insert sides, said edges connecting the cutting edges at the ends, are profiled to form an additional end cutting lip.

9. The indexable insert as claimed in claim 7, having an end cutting lip consisting of a plurality of individual radii.

10. The indexable insert for a side-milling cutter as claimed in claim 1, wherein the arcuate profile of the cutting edge is formed by an edge profile which starts from the respective top surface and extends concavely into the adjoining longitudinal insert side.

11. The indexable insert for a side-milling cutter as claimed in claim 1, wherein the arcuate profile of the cutting edge is formed by an edge profile which arches convexly outward or arches concavely inward in the plane of the respective top surface.

* * * * *